United States Patent
Grauer

(10) Patent No.: US 9,904,859 B2
(45) Date of Patent: Feb. 27, 2018

(54) OBJECT DETECTION ENHANCEMENT OF REFLECTION-BASED IMAGING UNIT

(71) Applicant: Brightway Vision, Ltd., Haifa (IL)

(72) Inventor: Yoav Grauer, Haifa (IL)

(73) Assignee: Brightway Vision, Ltd. (IL)

( * ) Notice: Subject to any disclaimer, the term of this patent is extended or adjusted under 35 U.S.C. 154(b) by 0 days.

(21) Appl. No.: 15/328,591

(22) PCT Filed: Dec. 3, 2015

(86) PCT No.: PCT/IL2015/051173
§ 371 (c)(1),
(2) Date: Jan. 24, 2017

(87) PCT Pub. No.: WO2016/092537
PCT Pub. Date: Jun. 16, 2016

(65) Prior Publication Data
US 2017/0270375 A1    Sep. 21, 2017

(30) Foreign Application Priority Data
Dec. 7, 2014 (IL) .......................................... 236114

(51) Int. Cl.
*H04N 7/18* (2006.01)
*G06K 9/00* (2006.01)
(Continued)

(52) U.S. Cl.
CPC ........ *G06K 9/00805* (2013.01); *G01S 17/107* (2013.01); *G01S 17/89* (2013.01);
(Continued)

(58) Field of Classification Search
None
See application file for complete search history.

(56) References Cited

U.S. PATENT DOCUMENTS 6,411,328 B1 * 6/2002 Franke ..................... G08G 1/04
340/937
7,202,776 B2 * 4/2007 Breed .................. B60N 2/2863
340/435
(Continued)

OTHER PUBLICATIONS

International Search Report and Written Opinion dated Mar. 8, 2016 for PCT/IL2015/051173 with an International Filing Date of Dec. 3, 2015 (10 Total Pages).

*Primary Examiner* — Chikaodili E Anyikire
(74) *Attorney, Agent, or Firm* — Luedeka Neely Group, P.C.

(57) ABSTRACT

Imaging system and method, the system including a main detection unit, an auxiliary detection unit, an image processor, and a controller. The main detection unit includes a light source that emits light pulses and a gated image sensor that receives reflections of the light pulses reflected from a selected depth of field in the environment and converts the reflections into a reflection-based image. The auxiliary detection unit includes a thermal sensor that detects infrared radiation emitted from the environment and generates an emission-based image. The image processor processes and detects at least one region of interest in the acquired reflection-based image and/or acquired emission-based image. The controller adaptively controls at least one detection characteristic of a detection unit based on information obtained from the other detection unit. The image processor detects at least one object of interest in the acquired reflection-based image and/or acquired emission-based image.

28 Claims, 6 Drawing Sheets

(51) Int. Cl.
    *G06K 9/46*           (2006.01)
    *H04N 5/232*        (2006.01)
    *G06K 9/62*           (2006.01)
    *G01S 17/89*         (2006.01)
    *G01S 17/93*         (2006.01)
    *G01S 17/10*         (2006.01)

(52) U.S. Cl.
    CPC .......... *G01S 17/936* (2013.01); *G06K 9/4661* (2013.01); *G06K 9/6293* (2013.01); *H04N 5/23216* (2013.01)

(56) References Cited

U.S. PATENT DOCUMENTS

| | | | |
|---|---|---|---|
| 8,519,837 B2 | 8/2013 | Kirsch et al. | |
| 8,525,728 B2 | 9/2013 | Lundmark et al. | |
| 8,842,182 B2 * | 9/2014 | Mimeault | G08G 1/04 348/149 |
| 2005/0269481 A1 * | 12/2005 | David | G01S 7/484 250/208.1 |
| 2006/0006331 A1 * | 1/2006 | Adamietz | B60R 1/00 250/330 |
| 2006/0146377 A1 * | 7/2006 | Marshall | G06T 3/4038 358/486 |
| 2013/0215235 A1 * | 8/2013 | Russell | H04N 13/0203 348/47 |

* cited by examiner

OBJECT DETECTION ENHANCEMENT OF REFLECTION-BASED IMAGING UNIT

CROSS-REFERENCE TO RELATED APPLICATIONS

This application is a National Phase application filed under 35 U.S.C. § 371 of PCT International Application No. PCT/IL2015/051173 with an International Filing Date of Dec. 3, 2015, which claims priority to Israel Patent Application No. 236114, filed on Dec. 7, 2014, the entire contents of which are incorporated herein by reference.

FIELD OF THE INVENTION

The present invention relates to active and passive imaging systems in general, and to imaging systems for object detection in a vehicular environment, in particular.

BACKGROUND OF THE INVENTION

Night vision imaging systems produce visible images of an environment having minimal ambient light, which would otherwise not be visible to the human eye. Such systems are used by military and law enforcement units, as well as various civilian applications. One such application is improving the visibility of a vehicle driver during night, rain, fog, or other poor visibility driving conditions. The generated image of the area surrounding the vehicle may be processed to provide various driver assistance and safety features, such as: forward collision warning (FCW), lane departure warning (LDW), traffic sign recognition (TSR), and the detection of pedestrians, obstacles, oncoming vehicles, or other objects of interest along the driving route. The image may also be displayed to the driver, for example projected on a head-up display (HUD) on the vehicle windshield. A vehicle night vision system may also be used to enable autonomous driving at low light levels or poor visibility conditions.

An imaging system may operate using "active imaging" or "passive imaging". An active imaging system involves actively illuminating the environment and accumulating reflections of the illumination light, whereas a passive imaging system merely collects existing ambient light or emitted/reflected radiation without additional illumination. For example, a passive imaging system may utilize a thermal or infrared camera, which senses differences in infrared radiation emitted by objects in the surrounding area and generates an "emission-based image" according to the sensed radiation differences. A passive imaging system may also collect light emitted or reflected from sources present in the environment, such as: vehicle high beams, streetlights, traffic lights, and the like. An active imaging system requires a light source to illuminate the environment and an imaging sensor to accumulate the reflected light, producing a "reflection-based image". Active imaging allows for a visible image to be generated even when there is little or no ambient light present in the environment. The light source may be, for example, an LED, a filtered light bulb, or a laser diode, and may transmit light in the form of continuous wave (CW) or in a series of pulses. The image sensor may be semiconductor based, such as charge-coupled devices (CCD), or active-pixel sensors (APS) produced using the complementary metal-oxide-semiconductor (CMOS) or the N-type metal-oxide-semiconductor (NMOS) processes.

The technique of synchronizing the illumination pulses with the camera activation in active imaging systems in order to image a particular depth of field (DOF) is known as "gated imaging". After the illumination pulse is transmitted, the camera remains in an off state (i.e., does not accumulate any reflected photons), while the pulse reaches the target area and light is reflected back toward the camera. When the reflected light is due to arrive at the camera, the camera is activated to open (i.e., to accumulate reflected photons). After the pulse is received, the camera is turned back off, while awaiting the transmission and reflection of the subsequent illumination pulse. The camera remains off for the duration of time required for the pulse to travel toward the target area and be reflected back, and is subsequently activated only for the duration required to receive the reflected light from the desired DOF. In this manner, the camera receives only reflections from the desired range, and avoids reflections from unwanted objects, such as particles in the atmosphere which may cause backscattering and reduce the contrast of the target area in the generated image. Gated imaging may also be employed to reduce the potential for oversaturation and blooming effects in the sensor, by collecting fewer pulses from shorter distances, thereby lowering the overall exposure level of the camera to near-field scenery and avoiding high intensity reflections from very close objects. Similarly, the light intensity or the shape of the illumination pulse may be controlled as a function of the distance to the target object, ensuring that the intensity of the received reflected pulse is at a level that would not lead to overexposure of the image sensor.

Vehicle-mounted imaging systems that operate solely using a reflection-based image (active illumination imaging) may sometimes produce unclear and indecipherable image content, such as insufficient contrast between potential objects of interest and the background, or insufficiently lit objects (due to the reflected signal intensity being too low). As a result, it may be difficult to ascertain with a high degree of confidence the presence of relevant objects in the environment (such as a pedestrian or a vehicle along the road), and to accurately identify whether they pose a potential hazard. A reflection-based image typically has a high resolution (e.g., at least VGA), where each pixel output is at least 8 to 10 bits if not more. Accordingly, a considerable amount of data must be processed in a reflection-based image in order to allow for object detection. The increased time and processing required to accurately determine potential hazards and relevant objects in the vehicle path based on such reflection-based images also necessitates a longer decision making period for the vehicle operator, which may increase the likelihood of a traffic accident. Finally, a single camera (or sensor) may be restricted to a particular spectral range, which may limit the object detection capabilities.

Conversely, vehicle-mounted imaging systems that operate solely using passive emission-based imaging provide very limited information, and are only capable of detecting objects in the environment that radiate above a sufficient level (or that are above at least a certain temperature) and that radiate in the selected wavelength range (e.g., infrared). Accordingly, such passive emission-based imaging systems typically fail to provide a comprehensive image of the entire environment, and can only provide the vehicle operator with limited information relating to relevant objects and potential hazards in the vicinity of the vehicle. Moreover, it is often difficult for an average person to properly understand and interpret a displayed emission-based image (such as a thermal image). Even for individuals that have experience and familiarity with these types of images, it usually still takes some time to process and register the connection between the contents of the thermal image and the real-world environment that is represented. Thus, the increased processing time to identify potential hazards in the thermal image also increases the decision making time of the vehicle operator, which ultimately raises the likelihood of a vehicle accident.

U.S. Pat. No. 7,786,898 to Stein et al., entitled: "Fusion of far infrared and visible images in enhanced obstacle detection in automotive applications", describes a vehicle warning system and method that determines a danger of collision between the vehicle and an object in the vehicle environment. The system includes a visible (VIS) light camera, a far infrared (FIR) camera, and a processor. The VIS camera is mounted in the vehicle cabin and acquires, consecutively and in real-time, multiple VIS image frames of a first field of view (e.g., in the direction of travel of the vehicle). The FIR camera is mounted in front of the vehicle engine and acquires, consecutively and in real-time, multiple FIR image frames of a second field of view (e.g., in the direction of travel of the vehicle). The processor detects an object in at least one of the VIS image frames, and locates the detected object in at least one of the FIR image frames. The processor determines a distance between the vehicle and the object responsive to the location of the detected object in both the VIS and FIR image frames, and determines if there is a danger of collision between the vehicle and the object at least partially responsive to the determined distance.

U.S. Patent Application No. 2006/0006331 to Adameitz et al., entitled: "Method for representing a front field of vision from a motor vehicle", describes a device and method that generates a representation of the field of vision in front of a vehicle, based on three detectors: a near-infrared (NIR) camera system, a far-infrared (FIR) camera system, and a sensor system (e.g., radar sensors and/or ultrasonic sensors and/or ultraviolet sensors). The information generated by each detector undergoes optimization, such as noise filtering, edge filtering, and contrast improvement, and is forwarded to a display after determining whether to superimpose the NIR data with the FIR data. If superimposition is carried out, the image areas of the two cameras are adapted to one another, and if appropriate also restricted. The optimized data of each detector also undergoes feature extraction to assist object detection. If an object which presents danger is recognized, a visual or audible warning is issued.

U.S. Pat. No. 8,525,728 to Lundmark et al., entitled: "Method of detecting object in the vicinity of a vehicle", discloses a method and system for detecting objects in the vicinity of a driven vehicle. The vehicle is equipped with a forward-facing camera and side-facing cameras. A processor analyzes the camera signals to detect objects by employing one or more detection criteria. The detection is regulated by detection parameters that define the sensitivity with which objects appearing in the camera images are detected. The detected objects are classified into different categories, following which an indication may be provided to the driver and one or more vehicle safety systems may be activated as necessary. A counter maintains a count of the number of objects detected in an image, and passes the information to a parameter adjuster. The parameter adjuster adjusts the detection parameters in accordance with the number of objects detected in previous frames relative to an optimum number of detections, such that the processing capability of the processor is utilized as completely as possible, in order to maximize the possibility of detecting the most relevant objects and enhance vehicle safety.

SUMMARY OF THE INVENTION

In accordance with one aspect of the present invention, there is thus provided an imaging system, which includes a main detection unit, an auxiliary detection unit, an image processor, and a controller. The main detection unit includes a light source and a gated image sensor. The light source is configured to emit light pulses toward an environment to be imaged, and the image sensor is configured to receive reflections of the light pulses reflected from a selected depth of field (DOF) in the environment and to convert the reflections into a reflection-based image. The auxiliary detection unit includes at least one thermal sensor, configured to detect infrared radiation emitted from the environment and to generate an emission-based image. The image processor is configured to process and to detect at least one region of interest (ROI) in an acquired reflection-based image and/or an acquired emission-based image. The controller is configured to adaptively control at least one detection characteristic of the main detection unit and/or the auxiliary detection unit, based on information obtained from the other one of the main detection unit or the auxiliary detection unit. The image processor is further configured to detect at least one object of interest in a reflection-based image and/or an emission-based image.

In accordance with another aspect of the present invention, there is thus provided an imaging method. The method includes the procedure of acquiring reflection-based images of an environment with a main detection unit, by emitting light pulses toward the environment using at least one light source, and receiving the reflections of the pulses reflected from a selected DOF in the environment and converting the reflections into a reflection-based image using at least one gated image sensor. The method further includes the procedure of acquiring emission-based images of the environment with an auxiliary detection unit, by detecting infrared radiation emitted from the environment and generating an emission-based image using a thermal sensor. The method further includes the procedure of processing and detecting at least one ROI in at least one acquired reflection-based image and at least one acquired emission-based image. The method further includes the procedure of adaptively controlling at least one detection characteristic of the main detection unit and/or the auxiliary detection unit, based on information obtained from the other one of the main detection unit or the auxiliary detection unit. The method further includes the procedure of detecting at least one object of interest in the reflection-based image and/or the emission-based image.

BRIEF DESCRIPTION OF THE DRAWINGS

The present invention will be understood and appreciated more fully from the following detailed description taken in conjunction with the drawings in which.

DETAILED DESCRIPTION OF THE EMBODIMENTS

The present invention overcomes the disadvantages of the prior art by providing an imaging system and method that enhances the object detection capabilities of a reflection-based imaging (e.g., active illumination) detection unit, using an auxiliary detector based on emission-based (e.g., passive) imaging. The imaging system adaptively sets or adjusts a detection characteristic relating to the reflection-based detection unit, such as by selectively modifying at least one imaging parameter or detection threshold, based on information obtained from the emission-based imaging detection unit. The imaging system may further adaptively set or adjust a detection characteristic relating to the emission-based detection unit, based on information obtained from the reflection-based imaging detection unit. A reflection-based image and emission-based image may be combined to form a merged image, which may be processed and/or displayed. Following an initial processing of the images acquired by both detection units, and controlling detection characteristics of each detection unit as applicable, the imaging system detects objects of interest in the environment, and provides an indication thereof. The imaging system may be mounted on a vehicle, allowing for enhanced detection and identification of objects of interest in the vicinity of a moving vehicle, to provide various driving assistance features, such as alerts of potential road hazards. The imaging system may operate in variable ambient lighting conditions (e.g., daytime or nighttime) and varying environmental conditions (e.g., different weather and climates).

Figure 1:
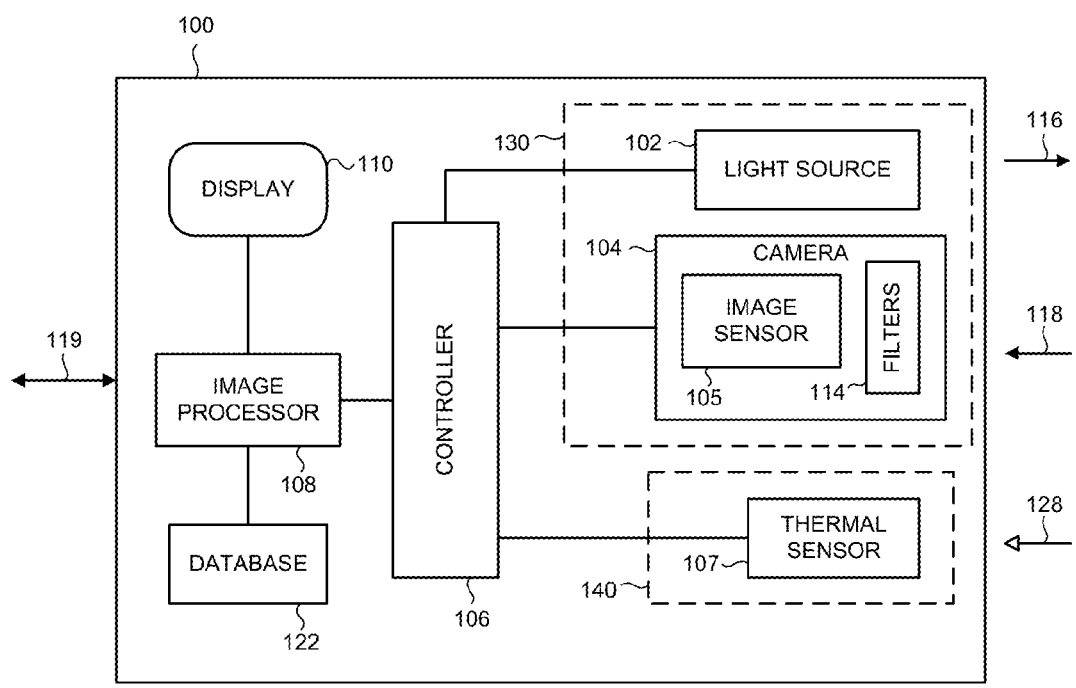
FIG. 1 is a schematic illustration of an imaging system for object detection, constructed and operative in accordance with an embodiment of the present invention.
Figure 2:
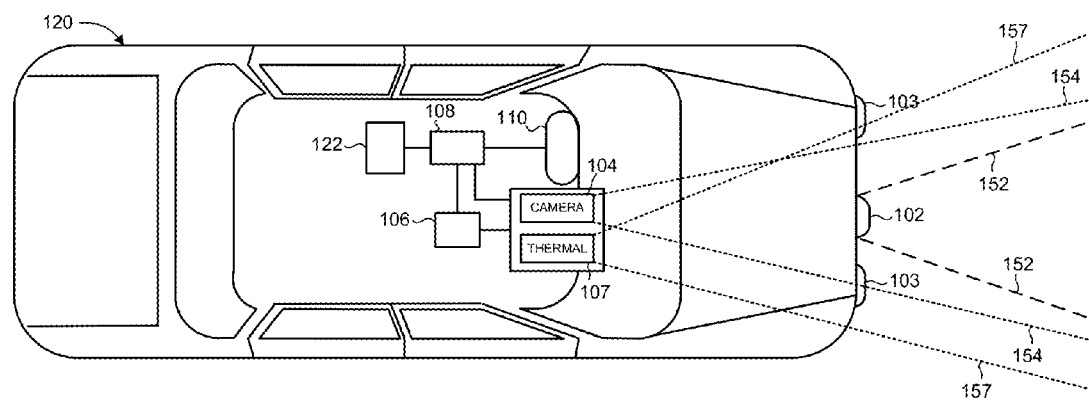
FIG. 2 is a schematic illustration of a top view of the imaging system of FIG. 1 mounted in a vehicle, constructed and operative in accordance with an embodiment of the present invention.

Reference is now made to FIG. 1, which is a schematic illustration of an imaging system, generally referenced 100, for object detection, constructed and operative in accordance with an embodiment of the present invention. System 100 includes a main detection unit 130 and an auxiliary detection unit 140. Main detection unit 130 includes at least one light source 102 and at least one camera 104. Auxiliary detection unit 140 includes a thermal sensor 107. System 100 also includes a controller 106, an image processor 108, a display 110, a database 122, and a data communication channel 119. Image processor 108 is coupled with controller 106, with display 110, and with database 122. Controller 106 is further coupled with light source 102, with camera 104, and with thermal sensor 107. Image processor 108 may optionally be directly coupled to camera 104 and/or to thermal sensor 107 (as shown in FIG. 2).

Main detection unit 130 generally operates using active imaging, in which an image of the scene is generated from accumulated light reflections (by sensor 105) after the transmission of light (by light source 102) to illuminate the scene. It is noted however that sensor 105 may also accumulate ambient or emitted light (such as vehicle headlights), i.e., without illumination from light source 102. For example, an image sensor 105 embodied by a CMOS image sensor (CIS) may operate in a passive imaging mode by using a "global shutter" function for a "5T" CIS configuration. Main detection unit 130 is configured with a gated imaging capability, such that the activation of camera 104 is synchronized with the illumination pulses (116) in order to image a particular depth of field (DOF). For example, camera 104 is activated to accumulate photons when the reflected pulses (118) from a specific distance are due to arrive at camera 104, and is deactivated or prevented from accumulated photons during other time periods. Main detection unit 130 may also operate in a non-gated imaging mode.

Light source 102 emits a series of light pulses, such as light pulse 116, toward an area to be imaged by system 100. Light source 102 may alternatively emit continuous wave (CW) radiation. The emitted light may be any suitable wavelength, such as in the near infrared (NIR) (e.g., between approximately 780-870 nm) or short wave infrared (SWIR) spectral range, or in the visible spectral range. For example, light source 102 may include a subunit that emits light in the visible spectrum (e.g., a smaller projector), such that once an object of interest is detected, the visible light projector is activated to illuminate the object for the vehicle driver (thereby alerting the driver to a potential hazard). Light source 102 may be embodied by a laser diode, such as an edge-emitting semiconductor laser or a vertical-cavity surface-emitting laser (VCSEL), or by a non-laser light source, such as a light-emitting diode (LED) or a gas discharge lamp. The particular characteristics of the emitted light may be selected in accordance with the imaged area and the environmental conditions. For example, the pulse width, the duty cycle, the pulse rise/fall time, the intensity (peak power), the polarization and/or the shape of the illumination pulse 116 may be controlled as a function of the distance to an object to be imaged (i.e., the desired DOF).

Camera 104 receives reflected light, such as reflected light pulse 118, reflected from objects illuminated by emitted light pulses 116. Camera 104 includes at least one image sensor 105 that accumulates reflected light pulses 118 and generates an image of the scene. Image sensor 105 may be, for example, a CCD sensor or a CMOS sensor, such as an active pixel sensor (APS) array. Image sensor 105 may also be a hybrid sensor (e.g., an indium gallium arsenide (InGaAs) based photodetector or a mercury cadmium telluride (MCT) based photodetector), with or without gain. Camera 104 may also include an image intensification device (e.g., an image intensifier) coupled with the sensor array 105. Image sensor 105 operates in a substantially similar spectral range as light source 102 (e.g., in the visible, NIR, and/or SWIR wavelengths). Image sensor 105 is configured to acquire at least one image frame, such as a sequence of consecutive image frames representing a video image, which may be converted into an electronic signal for subsequent processing and/or transmission. The image generated by image sensor 105 is referred to herein as a "reflection-based image" or a "main image", interchangeably, which encompasses any optical or digital signal representation of a scene acquired at any spectral region, and encompasses both a single image frame and a sequence of image frames (i.e., a "video image").

Camera 104 further includes optics (not shown), configured to direct reflected light pulses 118 to image sensor 105, such as: lenses, mirrors, fiber optics, waveguides, and the like. Camera 104 further includes optional filters 114, configured to filter out incoming light 118 according to particular filtering criteria. Filters 114 may be integrated with image sensor 105 and/or disposed in the adjacent optics. For example, filters 114 may include at least one bandpass filter, which passes through only wavelengths in the spectral range emitted by light source 102 (e.g., NIR light), while blocking light at other wavelengths. Such a bandpass filter may thus reduce incoming light from high-intensity light sources in the imaged scene, such as those that reflect/emit visible light (e.g., the headlights of oncoming vehicles). Filters 114 may also include a spectral filter, such as to direct selected wavelengths to different pixels of image sensor 105. Filters 114 may further include a polarization filter, such as in conjunction with a light source 102 that emits polarized light, where the polarization filter is configured to block incoming light having a particular polarization from reaching image sensor 105. Generally, objects reflect light without preserving the polarization of the incident light, but certain highly reflective objects, such as retroreflective traffic signs, do preserve the incident light polarization. Thus, a polarization filter may be configured to pass through received pulses 118 with a substantially perpendicular polarization to that of the emitted pulses 116, thereby reducing intense reflections from highly reflective objects, and mitigating potential saturation or blooming effects in the reflection-based image. Main detection unit 130 may adjust the degree by which the polarization is altered, such as by applying a partial rotation of the polarization (e.g., between 0-90° rotation) to reduce reflections from objects further away in the environment. Main detection unit 130 may adjust the emitted light polarization by roll adjustment of light source 102. Filters 114 may be implemented on the pixel array of image sensor 105 (i.e., such that different sensor array pixels are configured to only accumulate light pulses having different wavelength/spectral/polarization properties).

Main detection unit 130 may optionally include multiple cameras 104 and/or image sensors 105, such that different cameras/sensors are configured to collect reflections of different emitted pulses 116. For example, 3D information (i.e., a stereoscopic image) can be extracted using a triangulation and/or pulsing/gating scheme.

Auxiliary detection unit 140 operates using passive imaging, whereby thermal sensor 107 detects the thermal (e.g., infrared) radiation 128 emitted from the imaged environment, and then converts the detected radiation into thermal data (electronic signals or electrical charges) which can be stored, transmitted, or used to generate a thermal image, also referred to herein as an "auxiliary image" or "emission-based image". The terms "thermal image", "auxiliary image", and "emission-based image" encompasses both a single image frame and a sequence of image frames or a "video image", and more generally encompasses any signal data or information obtainable by thermal sensor 107, regardless of the amount of emitted infrared radiation actually detected within a given image (e.g., even if none of the pixels in the thermal image includes any "readable" image data). Thermal sensor 107 may be a relatively inexpensive sensor, characterized by: low resolution, small and basic optics (e.g., a single lens), a small processor (e.g., sufficient for low resolution), and basic electro-mechanical components. For example, the resolution of an image acquired by thermal sensor 107 may be approximately 10% of the resolution of an image acquired by image sensor 105. Thermal sensor 107 can be a forward looking infrared (FLIR) camera. Thermal sensor 107 may operate in the short wave infrared (SWIR) spectrum (e.g., between approximately 1.5-2.2 µm); medium wave infrared (MWIR) spectrum (e.g., between approximately 3-5 µm); or far infrared (FIR) spectrum (e.g., between approximately 8-14 µm). Thermal sensor 107 may be, for example, composed of: indium gallium arsenide (InGaAs), indium antimonide (InSb), vanadium oxide (VOx), galium arsenide (GaAs), a quantum-well infrared photodetector (QWIP), and/or materials such as zinc sulfide (ZnS). Auxiliary detection unit 140 may optionally include filters (not shown), such as spectral filters to enable the detection of different heat signatures (e.g., to distinguish an animal from a vehicle).

Controller 106 dynamically and adaptively controls the operation of main detection unit 130 and auxiliary detection unit 140. For example, controller 106 synchronizes the emission of laser pulses 116 by light source 102 with the exposure of camera 104 for implementing active gated imaging. Controller 106 also sets the various parameters of the transmitted light pulses 116, such as the pulse start time, the pulse duration (i.e., pulse width), the number of pulses per frame, and the pulse shape and pattern. Controller 106 may also adjusts the frame rate or other parameters relating to the image frames captured by camera 104 and thermal sensor 107. For example, controller 106 may establish the illumination level for each acquired frame and for each portion or "slice" (i.e., DOF) of a frame, such as by controlling the number of transmitted light pulses 116 and collected reflections 118 for each frame slice, controlling the number of frame slices within each frame, controlling the exposure duration of camera 104 as well as the timing of the exposure with respect to the transmitted light pulse 116. Controller 106 may also control the gain of image sensor 105 (or thermal sensor 107), such as using an automatic gain control (AGC) mechanism. Controller 106 may also control the exposure of image sensor 105 (or thermal sensor 107), such as using an automatic exposure control (AEC) mechanism. In general, controller 106 may dynamically adjust any parameter as necessary during the course of operation of imaging system 100. Controller 106 may be integrated in a single unit together with camera 104, with thermal sensor 107, and/or with image processor 108.

Image processor 108 receives the reflection-based image captured by camera 104 and the thermal image acquired by thermal sensor 107, and performs relevant processing and analysis of the images. Image processor 108 may merge or combine information from the reflection-based image and the thermal image to generate a fused image, as will be discussed further hereinbelow. Image processor 108 may also analyze the acquired images (and/or a fused image) to detect and/or identify at least one object of interest in the environment, as will be discussed further hereinbelow. For example, image processor 108 may be configured to help provide various driver assistance features in a vehicle-mounted imaging system.

Display 110 displays the images generated by imaging system 100, such as a main image from main detection unit 130, an auxiliary image from auxiliary detection unit 140, and/or a fused image that combines at least a portion of a main image with at least a portion of an auxiliary image. The displayed image may be combined with the ambient scenery, allowing a user to view both the display image and the ambient scene simultaneously, while maintaining external situational awareness. For example, display 110 may be a head-up display (HUD), such as a HUD integrated in a vehicle windshield of a vehicle-mounted imaging system. When an object of interest in the environment is detected, display 110 may present a view of the detected object being illuminated by a visible light subunit of light source 102.

Database 122 stores relevant information, which may be used for assisting the detection and identification of objects in the acquired images, such as thermal signature data associated with different objects in different environmental conditions.

Data communication channel 119 allows for sending and receiving images, alerts or other data to internal system components or to an external location. Data communication channel 119 may include or be coupled with an existing system communications platform, such as in accordance with the CAN bus and/or on-board diagnostics (OBD)

protocols in a vehicle. For example, imaging system 100 may receive information relating to the current vehicle status, such as: velocity; acceleration; orientation; and the like, through the vehicle communication bus. Imaging system 100 may also receive information from external sources over communication channel 119, such as location coordinates from a global positioning system (GPS), and/or traffic information or safety warnings from other vehicles or highway infrastructure, using a vehicular communication system such as vehicle-to-vehicle (V2V) or vehicle-to-infrastructure (V2I).

Imaging system 100 may optionally include and/or be associated with additional components not shown in FIG. 1, for enabling the implementation of the disclosed subject matter. For example, system 100 may include a power supply (not shown) for providing power to the various components, which may be integrated with, or receive power from, the main power source in the vehicle. System 100 may further include an additional memory or storage unit (not shown) for temporary storage of image frames, thermal image data, or other data. System 100 may also include an operator interface (not shown) for allowing an operator of system 100 to control various parameters or settings associated with the components of system 100. System 100 may also include a vehicle interface (not shown) for allowing another system in the vehicle to control various parameters or settings of system 100.

The components and devices of imaging system 100 may be based in hardware, software, or combinations thereof. It is appreciated that the functionality associated with each of the devices or components of system 100 may be distributed among multiple devices or components, which may reside at a single location or at multiple locations. For example, the functionality associated with controller 106 or image processor 108 may be distributed between multiple controllers or processing units.

According to an embodiment of the present invention, imaging system 100 is mounted onto a vehicle. The term "vehicle" as used herein should be broadly interpreted to refer to any type of transportation device, including but not limited to: an automobile, a motorcycle, a truck, a bus, an aircraft, a boat, a ship, and the like. It is appreciated that the imaging system of the present invention may alternatively be mounted (at least partially) on a non-vehicular platform, such as a stationary, portable or moveable platform, e.g., a pole, fence or wall of a secured perimeter or surveillance zone.

Reference is now made to FIG. 2, which is a schematic illustration of a top view of the imaging system (100) of FIG. 1 mounted in a vehicle, referenced 120, constructed and operative in accordance with an embodiment of the present invention. Display 110 is mounted in front of a user, such as the driver of vehicle 120, and may be a heads-up display (HUD) which projects images on the vehicle dashboard or windshield. Imaging system 100 may be installed in vehicle 120 in a "forward looking configuration", in which light source 102, camera 104, and thermal sensor 107 face toward the front side of vehicle 120 (as depicted in FIG. 2). Alternatively, imaging system 100 may be installed in a "rear looking configuration" in vehicle 120, where the components face the rear side of vehicle 120. Further alternatively, the components may be installed in a "surrounding configuration", in which multiple cameras 104 and/or thermal sensors 107 collectively provide substantially 360° coverage around vehicle 120. Light source 102 may be integrated in the vehicle headlights 103 (in a forward looking configuration) or taillights (in a rear looking configuration). Alternatively, light source 102 can be a stand-alone unit, such as a fog lamp or other illuminator mounted at the front grille (as depicted in FIG. 2), or in the bumper or a side mirror of vehicle 120. Light source 102 may be embodied as multiple elements (e.g., within two separate vehicle headlights 103). Thermal sensor 107 may be integrated with light source 102, and may also be integrated into an existing light source of vehicle (such as vehicle headlights 103), or may be installed as a standalone unit. Camera 104 and thermal sensor 107 may be mounted on an external surface of vehicle 120, such as on the front (exterior) side of the vehicle, in order to avoid degradation (transmission loss) of the reflected or emitted signals (e.g., incoming reflection pulses 118 and/or thermal radiation signal 128) due to the windshield or window. Alternatively, camera 104 and/or thermal sensor 107 may be installed on an interior vehicle surface, such as the inside of the vehicle windshield (configured to be penetrated by the incoming reflected pulses 118 and thermal radiation 128), such as behind the rear-view mirror. If thermal sensor 107 is installed on an external surface, then auxiliary detection unit 140 may optionally include a cleaning mechanism, such as a wiper and/or a cleansing spray.

The field of view (FOV) of camera 104 (depicted by the dotted lines 154) overlaps with and is substantially similar to the field of illumination (FOI) of light source 102 (depicted by the dashed lines 152). In the configuration of FIG. 2, the FOV of camera 104 is encompassed within the FOV of thermal sensor 107 (depicted by the dotted lines 157). More generally, the FOV of camera 104 at least partially overlaps with the FOV of thermal sensor 107. For example, camera 104 has a narrow FOV and high resolution, and is operative for capturing light reflected from objects illuminated by light source 102, while thermal sensor 107 has a wide FOV and low resolution, and is operative for capturing emitted thermal radiation in a FOV 157 that encompasses the FOV 154 of camera 104. Alternatively, camera 104 may have a wider FOV than thermal sensor 107, or camera 104 and thermal sensor 107 may have substantially similar FOVs.

Controller 106 and database 122 are disposed in or mounted on vehicle 120, and may be integrated with other system elements (such as camera 104 or image processor 108), or with other vehicle control units (not shown). All the elements of system 100 are configured and mounted such that they do not interfere with the functioning of other existing vehicle components and produce minimal interference to the driver of vehicle 120.

System 100 images the environment in the vicinity of vehicle 120, by generating at least one main image using main detection unit 130, and generating at least one auxiliary image using auxiliary image unit 140. In particular, light source 102 emits a series of light pulses to illuminate the environment in the vicinity of vehicle 120, and camera 104 collects the light reflected from the illuminated environment and generates a main (reflection-based) image. Concurrently, thermal sensor 107 collects thermal data from the environment in the vicinity of vehicle 120 and generates an auxiliary (emission-based) image. Image processor 108 processes the main image and the auxiliary image to detect regions of interest (ROIs) in the environment. Controller 106 adaptively controls at least one detection characteristic relating to main detection unit 130 and/or auxiliary detection unit 140 (as elaborated upon further hereinbelow), based on the ROIs determined in the main image and auxiliary image. Subsequently, image processor 108 detects at least one object of interest in the main image and/or the auxiliary image. An "object of interest" (or a "region of interest") may be any size, shape or pattern corresponding to one or more physical points in a real-world environment. For example, the object of interest may represent a unified physical object or entity located in the environment, or may represent a general environmental feature or collection of features (and not necessarily a unified physical object). The object of interest may be dynamic, such that at least one characteristic of the object changes over time. For example, the object of interest may be in motion, such that its position relative to vehicle 120 is continuously changing while being imaged. Processor 108 may designate at least one object of interest in the environment for further investigation, or to be brought to the attention of a driver or passenger of vehicle 120. For example, processor 108 detects relevant objects located along the current route of vehicle 120, some of which may pose a potential danger to a driver or passenger of vehicle 120.

Upon detection of an object of interest, system 100 may perform one or more appropriate actions. For example, system 100 may generate an alert or notification relating to the detected object of interest, such as a visual or audio indication of the object of interest, such as by presenting augmented reality (AR) content on display 110 (e.g., symbols/graphics/text/imagery relating to the driving environment). The alert or notification relating to a detected object of interest may be integrated with a driving assistance module in vehicle 120 configured to provide a driving assistance feature, such as: forward collision warning (FCW), lane departure warning (LDW), traffic sign recognition (TSR), high beam control, detection and/or identification of objects (such as vehicles, pedestrians or animals), and any combination thereof.

Imaging system 100 adaptively sets or adjusts at least one detection characteristic of main detection unit 130 and/or auxiliary detection unit 140, following processing of obtained main images and auxiliary images, such as to enhance object detection capabilities. In general, a detection characteristic relating to one detection channel (main or auxiliary) may be selected or modified, based on the information obtained in the other detection channel. Controller 106 may establish or modify the operating parameters of main detection unit 130, such as by applying selected imaging parameters of light source 102 and/or camera 104 when acquiring subsequent reflection-based images. For example, controller 106 may direct main detection unit 130 to acquire additional images in a selected ROI identified in an auxiliary image detected by thermal sensor 107, such as by limiting the FOV 154 of camera 104 and/or the FOI 152 of light source 102, and/or by further restricting the imaged DOF. For example, processor 108 may detect a potential object candidate in the auxiliary image (i.e., a "coarse" or "partial" object detection), such as by identifying a general ROI characterized by larger (or smaller) thermal radiation (i.e., a higher/lower temperature region) than other regions in the thermal image, which is considered insufficient for accurate detection of an object. Controller 106 may then direct main detection unit 130 to focus on the ROI identified in the auxiliary image, which may represent a potential object. Main detection unit 130 may also be configured to track the ROI or potential object, using object tracking techniques known in the art. Controller 106 may adaptively adjust at least one imaging parameter of main detection unit 130, including but not limited to: a gating parameter; a pulse width; a pulse intensity; a pulse shape; a gating cycle duration; a delay time of a gating cycle; the frame rate of image sensor 105; a DOF to be imaged; a maximum range to be imaged; the FOI of light source 102; the FOV of image sensor 105 or camera 104; the sensitivity of image sensor 105; and any combination thereof. Conversely, controller 106 may adaptively set or adjust at least one imaging parameter of auxiliary detection unit 140, including but not limited to: the direction (alignment), the FOV, and/or the sensor gain of thermal sensor 107, such as to focus on a selected ROI detected in a main image. The FOV of thermal sensor 107 can be modified by binning pixels in the FPA or by moving lens elements.

A further detection characteristic that may be adaptively controlled is an object detection threshold in at least one of the detection channels. For example, a detection threshold in main detection unit 130 may be lowered in at least a main image region corresponding to an ROI detected in an auxiliary image. Conversely, a detection threshold in auxiliary detection unit 140 may be lowered in at least an auxiliary image region corresponding to an ROI detected in a main image. The detection threshold adjustment may be implemented by adjusting at least one of the following: a candidate detection module; a control points classification module; a nearest neighbor classification module; a clustering module; a tracker module; a motion detection module; a final detection module; and/or the object classifications stored in database 122. The candidate detection module is an initial screening process for all pixels in an image, which determines whether a pixel is located in the center of a bright vertical object. By adjusting a candidate detection threshold, the more complex processes of the object detection algorithm may be applied on a smaller percentage of the image pixels. The control points classification module is an initial shape-based classification process intended to determine whether the image pixels of an object candidate (identified in a candidate threshold process) are located at the center of an object (e.g., a pedestrian), using the pixel values within the detection window. The nearest neighbor classification module is a second shape-based classification process intended to further eliminate false positive detections (i.e., false alarms) that were incorrectly detected as objects in the control points classification. This module is a classification process trained off-line and based on histograms of oriented gradients, using a K-nearest neighbor (KNN) algorithm. The clustering module establishes a boundary for each object in the image, by clustering close points from the same resolution and from different resolutions into a single point per object and then determining a suitable bounding region. The tracker module is intended to ensure that only a single detection is provided for each object, to enable temporal filtering of objects, and to track an object even in image frames the object was not detected in. In order to track the object through the image frames in which the object appears, the tracker module associates between detections of the same object in different image frames. The motion detection module allows for further reducing false positives by using temporal data of the object. For example, a pedestrian is (typically) a non-rigid moving object, as opposed to other objects in the environment that are stationary (e.g., traffic signs, vehicles, lampposts). Accordingly, a pedestrian may be detected by examining a series of consecutive image frames and searching for objects with internal movement. The final decision module integrates the various temporal and spatial data relating to the object, in order to detect and identify the object (e.g., determining whether the object represents a pedestrian).

Controller 106 may also adaptively set the number of processed image frames of a main image and/or an auxiliary image, before finalizing the detection of an object of interest. For example, following the detection of an ROI in an acquired thermal image, image processor 108 may be directed to further process and analyze the corresponding image regions in at least a minimum number of subsequent reflection-based images (e.g., at least the next three reflection-based images) in order to verify the presence of an object within the ROI. In general, each detection unit 130, 140 may be selectively controlled in accordance with information obtained in the respective image of the other detection unit 130, 140. It is noted that such information is not limited to the detection of an ROI in one of the images. For example, image processor 108 may determine that a particular environmental area was not fully or clearly imaged in the reflection-based image (e.g., due to obstructions or interference in the propagation path of the emitted/reflected pulses, or alternatively, due to pixel saturation of image sensor 105 resulting from high-intensity reflective/transmitting sources in the environment). Controller 106 may then direct auxiliary detection unit 140 to focus on the particular environmental area(s) for which insufficient image content was obtained by main detection unit 130. For another example, the imaged environment may result in lower quality or unusable thermal images acquired by thermal sensor 107, such as due to smog, rain or fog in the atmosphere, or oversaturation, in which case processor 108 may be directed to exclude at least a minimum number of subsequent emission-based images (e.g., excluding all thermal image frames acquired while the environmental conditions were not conducive).

System 100 may optionally generate a merged image by combining a reflection-based image obtained by main detection unit 130 with an emission-based image obtained by auxiliary detection unit 140. In particular, image processor 108 may combine at least a portion of an emission-based image obtained by thermal sensor 107 with at least a portion of a reflection-based image captured by image sensor 105, using suitable image fusion techniques. Image processor 108 may also add further supplementary content onto the combined image, such as symbols/graphics/text/imagery relating to the driving environment. Display 110 may then display the merged image to the user (e.g., a driver or passenger of vehicle 120).

Figure 3:
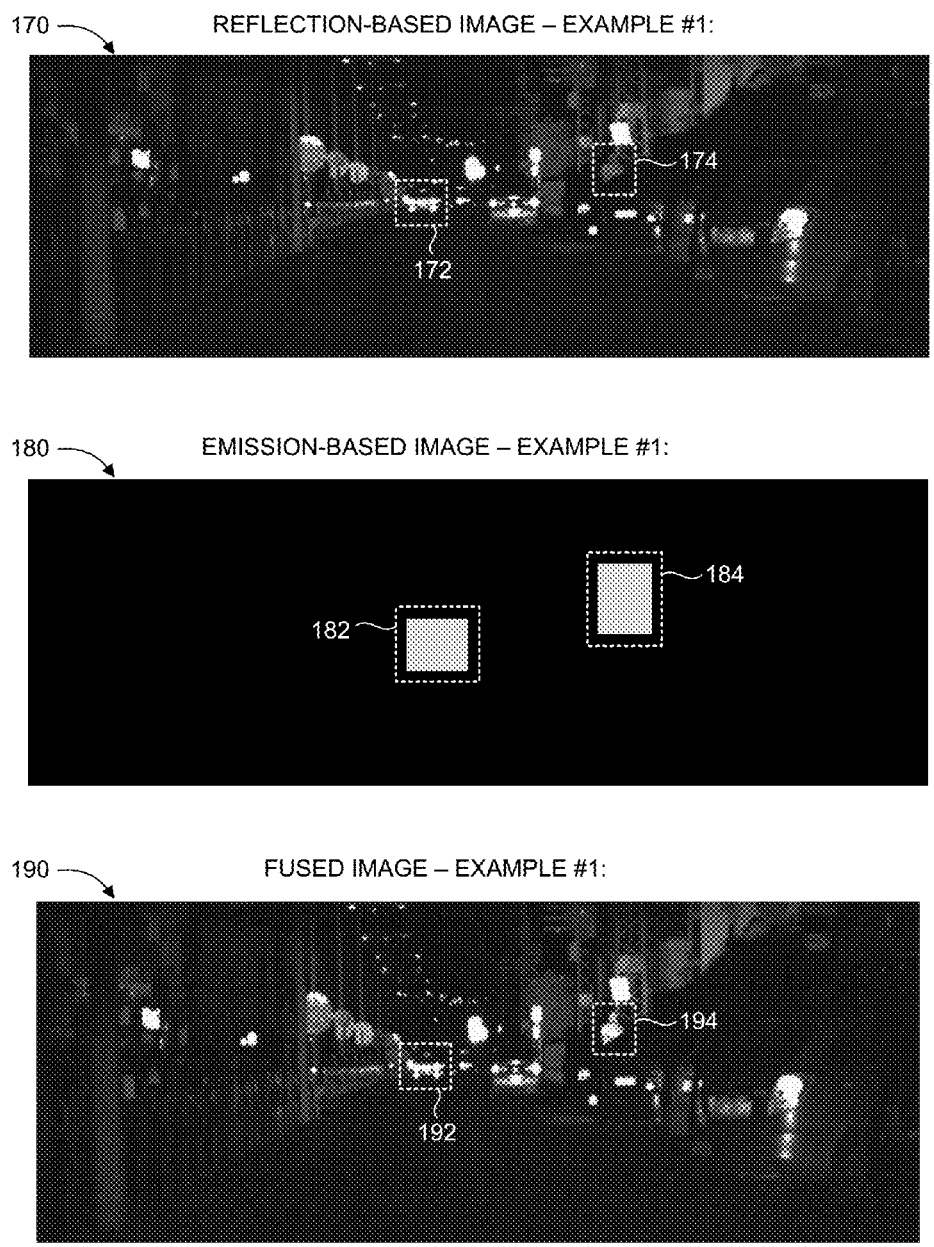
FIG. 3 is a first exemplary set of images acquired by the imaging system of FIG. 1, operative in accordance with an embodiment of the present invention.

Reference is now made to FIG. 3, which is a first exemplary set of images acquired by the imaging system (100) of FIG. 1, operative in accordance with an embodiment of the present invention. Main detection unit 130 acquires a main (reflection-based) image 170, while auxiliary detection unit 140 acquires an auxiliary (emission-based) image 180, e.g., following Non-Uniformity Correction (NUC) and AGC threshold control. Image processor 108 receives main image 170 from main detection unit 130, and attempts to identify objects of interest in main image 170. Processor 108 detects and identifies an object in image region 172, and further detects a region of interest (representing a potential object candidate) in image region 174. Whereas the object in image region 172 is easy to detect and identify (as a vehicle), image region 174 appears unclear and indefinite and is obscured by other elements in the environment. For example, an unclear image region of a reflection-based image may depict a general outline or crude shape, or may be characterized with minimal contrast between the potential object and the background, or the potential object may be obscured by other image features. As a result, processor 108 cannot ascertain the presence and/or type of object in image region 174 with a high degree of confidence (i.e., with a high "probability of detection (POD)"). Image processor 108 further receives emission-based image 180 from auxiliary detection unit 140. Processor 108 identifies regions of interest (ROIs) 182, 184 in emission-based image 180, which are characterized by substantially larger thermal radiation (higher temperatures) than other regions in emission-based image 180. Processor 108 proceeds to enhance reflection-based image 170 using details from emission-based image 180. In particular, processor 108 may generate merged image 190, by combining the thermal information of ROIs 182, 184 in auxiliary image 180 with the respective image regions 172, 174 of main image 170, using suitable image fusion techniques. In addition to (or instead of) generating a merged image, controller 106 may direct main detection unit 130 to obtain further reflection-based images focused particularly at the respective DOF associated with ROIs 182, 184. More generally, processor 108 may analyze each detection channel (130, 140) to obtain potential object candidates (ROIs), and then controller 106 may adjust imaging parameters of main detection unit and/or auxiliary unit 140, which then collect additional reflection-based images and/or additional emission-based images, as necessary, in order to reduce the number of potential candidates. This process may be repeated in an iterative manner, by continuously obtaining feedback from the images (170, 180) and adjusting imaging parameters of each detection channel (130, 140) accordingly. Subsequently, processor 108 can analyze merged image 190, and/or the additionally acquired reflection-based/emission-based images (that may also be used to generate additional merged images), to accurately detect the presence of objects that may not have been detectable in the original images 170, 180. Processor 108 may further categorize and identify the detected objects, using information from database 122 if applicable. For example, image processor 108 may compare thermal data (i.e., "thermal signatures") obtained in emission-based image 180 with predefined information stored in database 122 associating different objects with their expected thermal signatures. In the example of FIG. 3, image region 194 is identified as a pedestrian and image region 192 is identified as a vehicle. System 100 may then indicate the detected objects to user, such as by presenting merged image 190 on display 110 together with text or symbols indicating information or characteristics associated with each detected object (e.g., type of object; distance from vehicle 120; level of potential danger; and the like). System 100 may also provide warnings relating to the detected objects, as necessary, such as in conjunction with relevant driving assistance modules.

Figure 4:
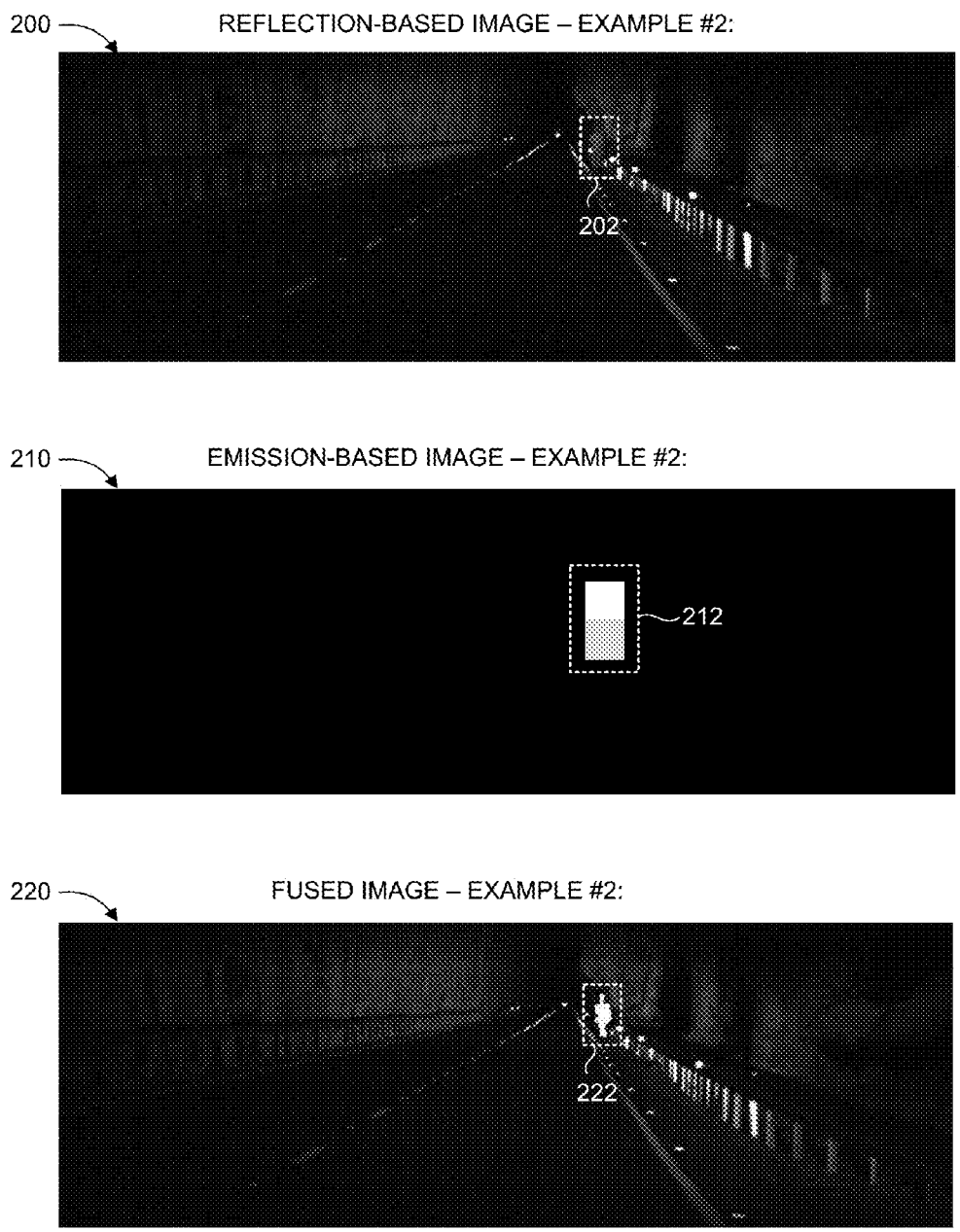
FIG. 4 is a second exemplary set of images acquired by the imaging system of FIG. 1, operative in accordance with an embodiment of the present invention.

Reference is now made to FIG. 4, which is a second exemplary set of images acquired by the imaging system (100) of FIG. 1, operative in accordance with an embodiment of the present invention. Image processor 108 receives a reflection-based image 200 acquired by main detection unit 130, and an emission-based image 210 acquired by auxiliary detection unit 140 (after Non-Uniformity Correction (NUC) and AGC threshold control), and attempts to detect object candidates or ROIs in each image 200, 210. Processor 108 identifies an ROI 202 in reflection-based image 200, where ROI 202 appears unclear and difficult to accurately identify. Processor 108 identifies an ROI 212 in emission-based image 210 (corresponding to ROI 202 of reflection-based image 200). Processor 108 may generate merged image 220, by combining image data (thermal information) of ROI 212 in emission-based image 210, with the corresponding ROI 202 of reflection-based image 200, using suitable image fusion techniques. Controller 106 may also direct main detection unit 130 and/or auxiliary detection unit 140 to collect additional reflection-based images and/or emission-based images, after adjusting imaging parameters of at least one of the detection channels 130, 140 according to image information obtained from the initially acquired images 200, 210 (e.g., based on analysis of ROIs 202, 212). Processor 108 then detects objects of interest in merged image 220 (and/or using additionally reflection-based/emission-based images), and may further categorize and identify the detected objects. In the example of FIG. 3, image region 222 (corresponding to ROIs 202, 212) is identified as a pedestrian.

Figure 5:
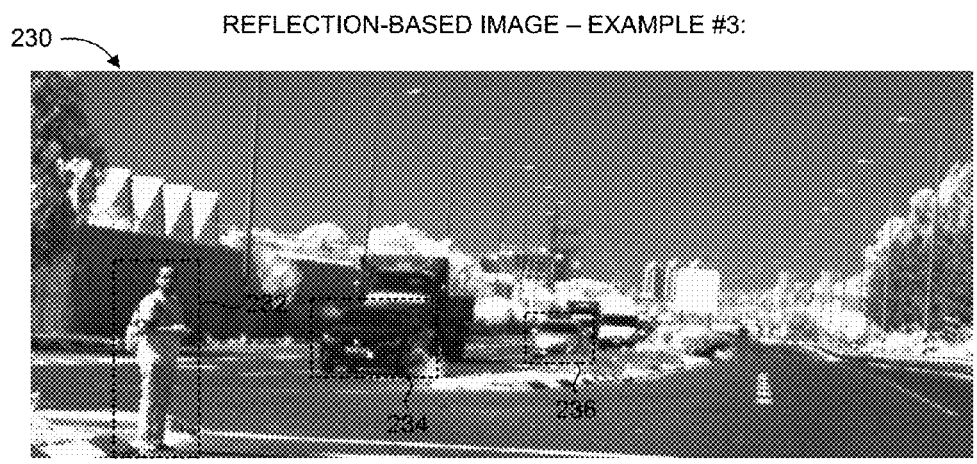
FIG. 5 is a third exemplary set of images acquired by the imaging system of FIG. 1, operative in accordance with an embodiment of the present invention.
Figure 5:
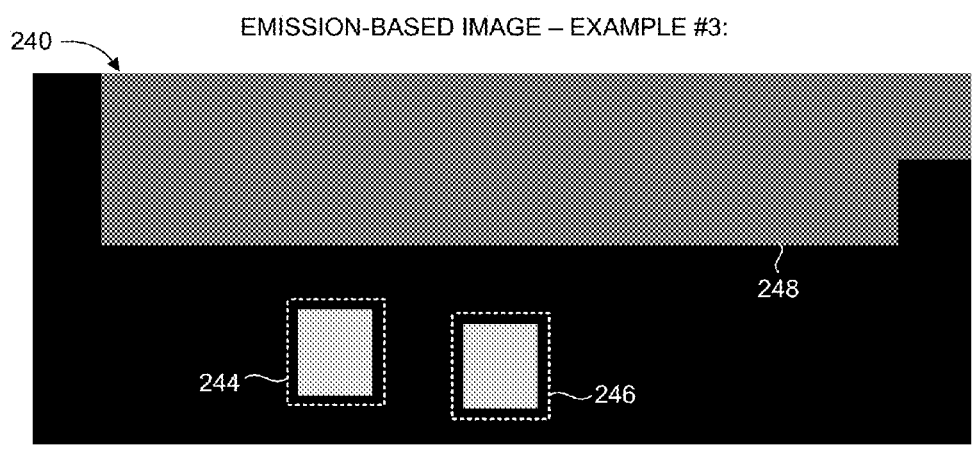

In some cases, it may be possible to obtain sufficient information from the original images acquired by one of the detection channels 130, 140 and to identify objects of interest directly in the acquired images. Reference is now made to FIG. 5, which is a third exemplary set of images acquired by the imaging system (100) of FIG. 1, operative in accordance with an embodiment of the present invention. Main detection unit 130 acquires a reflection-based image 230 (e.g., with light-source 102 non-operational), and auxiliary detection unit 140 acquires an emission-based image 240. Image processor 108 identifies object candidates (ROIs) 232, 234, 236 in reflection-based image 230, and identifies object candidates (ROIs) 244, 246, 248 in emission-based image 240, where ROIs 244 and 246 correspond to ROIs 234 and 236, respectively. It is noted that processor 108 does not identify an ROI in emission-based image 240 corresponding to ROI 232 of reflection-based image, due to the low contrast in this spectrum associated with ROI 232. Nevertheless, image regions 232, 234, 236 appear sufficiently clear in reflection-based image 230 such that processor 132 can identify all of the respective objects (including object 232), as representing: a pedestrian (232) and vehicles (234, 236), respectively. By analyzing both images 230, 240, image processor 108 may obtain further relevant information, such as determining that ROI 248 of emission-based image 240 represents the sky, as evident from reflection-based image 230 (where images 230, 240 were collected during daytime and bright ambient light conditions).

Referring back to FIG. 1, main detection unit 130 may operate in a gated imaging mode in order to image a selected DOF (or multiple selected DOFs), which may help reduce image clutter and facilitate image processing. For example, main detection unit 130 may implement gated imaging in order to avoid receiving intense reflections from highly reflective objects (e.g., retroreflective traffic signs, retroreflective vehicle rear bumper) that are known to be located at a particular DOF relative to vehicle 120, which can lead to saturation or blooming effects in the active image. Gated imaging may also be employed to minimize reflections from atmospheric particles in the immediate vicinity, which may cause backscattering and reduce the contrast of the target area in the generated reflection-based image. Controller 106 may control and synchronize the operation of light source 102 and camera 104 to accumulate a different number of reflected pulses for different scenery ranges or "slices" (e.g., accumulating fewer reflected pulses from shorter distances, and a greater number of reflected pulses from farther distances). For example, controller 106 may adjust the pulse intensity, the pulse width, the pulse shape, the duty cycle, the pulse rise/fall time, and/or the number of pulses emitted by light source 102, as well as the timing and duration of camera 104 activation (exposure time), to selectively accumulate different reflections from different DOFs. For example, main detection unit 130 may generate a short-range reflection-based image by emitting/accumulating a small number of pulses; an intermediate-range active image by emitting/accumulating a moderate number of pulses; and a long-range active image by emitting/accumulating a high number of pulses. Thus, consecutive image frames may differ in illumination level, which allows for focusing on a selected DOF in the reflection-based images, such as following a "partial detection" of a potential object candidate in an earlier image.

According to an embodiment of the present invention, image processor 108 may perform character recognition of objects in the imaged scene with text or numerical data, such as traffic signs, for example by using optical character recognition (OCR) techniques known in the art. Image processor 108 may also analyze textual or numerical content to provide supplemental driving assistance features, such as to identify potential driving hazards or for navigation purposes. For example, system 100 may notify the driver of vehicle 120 if he/she is turning onto the correct road, by analyzing the content of traffic or street signs in the vicinity of vehicle 120, optionally in conjunction with available maps and the real-time location of vehicle 120. System 100 may determine the optimal illumination level for imaging, in order for the visibility of characters on the sign to be as high as possible, and adjust imaging parameters accordingly. For example, controller 106 may adjust the operating parameters of light source 102 and/or camera 104 such as to acquire the lowest illumination image that will accurately enable pattern and text recognition (e.g., in order to conserve power and to minimize saturation effects). Following a general determination of the type of traffic or street sign (or other high-intensity source), such as based on the shape and/or image information associated with the sign (e.g., text/numerical data), image processor 108 may also add color information to the traffic signs on an acquired or generated (fused) image. Such color information may also be obtained from spectral filters 114 implanted on image sensor 105 of camera 104. Active-gated imaging may also be applied for removing unwanted markings in the image frames, such as road tar marks or concrete grooves.

It is noted that camera 104 and thermal sensor 107 may be characterized with different imaging parameters or characteristics, such as at least one of: FOV, resolution, pixel dimensions, sensitivity, and the like. Main detection unit 130 and auxiliary detection unit 140 may use at least some of the same optics and/or detection channel. Such a configuration may reduce the overall power consumption of system 100.

Imaging system 100 may optionally include additional detection/measurement units or imaging sources (not shown), in addition to detection units 130, 140, including but not limited to: a radar detector; a lidar detector; stereoscopic cameras; and the like. The additional detection sources may be remotely located from at least some components of system 100, and may forward measurement data to system 100 via an external (e.g., wireless) communication link. The information obtained from the additional sources may be used to enhance the object detection capabilities, such as in determining how or whether to adaptively control detection characteristic of detection units 130, 140. For example, system 100 may obtain distance information relative to potential objects in the environment, and controller 106 may then adjust at least one gating parameter of main detection unit 130 accordingly. The distance information may be obtained from an external measurement unit (e.g., a laser rangefinder), or alternatively may be determined based on information from main detection unit 130 (e.g., based on the relative timing between emitted pulses 116 from light source 102 and detected pulses 118 by image sensor 105). Processor 108 may also utilize distance information for object detection and identification purposes. For example, image processor 108 may determine an expected thermal signature from a particular object located at a certain distance (DOF), and then compare the thermal signature in the obtained emission-based image at that distance with information stored in database 122 to identify the object. Image processor 108 may also take into account how the thermal signature changes as a function of distance (e.g., the thermal signature of a person will be expected to change in a certain way as the person approaches or recedes). For another example, system 100 may obtain information relating to the environmental conditions in the imaged environment, such as for example: lighting conditions (e.g., sunny or overcast); weather or climate conditions (e.g., rain, fog, or snow); time of day (e.g., day or night); month of year or season; and the like. The obtained environmental conditions may be utilized for enhancing a main image, auxiliary image, and/or merged image (e.g., adjusting the brightness level in the image); for controlling the operation of detection units 130, 140 (e.g., adjusting at least one imaging parameter of light source 102, camera 104, and/or thermal sensor 107); and/or for enhancing object detection and identification (e.g., selectively modifying an object detection threshold). In particular, the thermal signature from an object may be substantially influenced by the environmental conditions, and so image processor 108 may take the environmental conditions into account when attempting to identify a potential object in a reflection-based image and/or an emission-based image (and/or a merged image). For yet another example, image processor 108 may use a digital map or other location data source to assist and enhance the interpretation of detected objects, such as to navigate a driver of vehicle 120 based on character recognition of street signs in the images in conjunction with map analysis. In general, a detection characteristic of main detection unit 130 and/or auxiliary detection unit 140 may be modified as a function of real-time parameters including but not limited to: the speed of vehicle 120; the location of vehicle 120 (e.g., urban road, inter-city road, etc); the weather conditions; the type of object(s) desired to detect; and the type of object(s) actually detected.

It is appreciated that detection units 130, 140 may be configured to operate during both day and night, and in variable weather and climate conditions (e.g., clear and sunny, or overcast, rain, fog, snow, hail, etc), allowing for effective imaging and object identification by system 100 in varying environmental conditions. It is further appreciated that the use of auxiliary detection unit 140 may serve to enhance the object detection capabilities of main detection unit 130. In particular, by supplementing the information of the main detection channel obtained in one spectral range (e.g., NIR-SWIR) with information in other spectral ranges (e.g., MWIR-FIR) of the auxiliary detection channel, a higher probability of detection (POD) may be achieved, as well as a lower false detection rate. Furthermore, the use of a relatively small and low resolution thermal sensor 107 in auxiliary detection unit 140 (e.g., approximately 10% of the resolution of image sensor 105) may provide various benefits, including: ease of installation and integration, and the ability to use small (low cost) optics and small (low cost) electronics. A low resolution thermal sensor 107 may also result in reduced power consumption for image processing. In particular, a reflection-based image (such as images 170, 200, 230) is typically characterized by relatively high resolution (e.g., at least VGA), which requires a substantial amount of data processing (e.g. at least 8-10 bits or more) to enable object detection. Therefore, since image processor 108 initially attempts to identify potential object candidates in the emission-based image, and may limit the subsequent analysis in the reflection-based image to only the relevant regions identified from the emission-based image, the overall processing power of imaging system 100 may be reduced considerably.

According to another embodiment of the present invention, a plurality of imaging systems, similar to system 100 of FIG. 1, can operate together in a common environment. The timing of parameters relating to an image frame of at least one of the imaging systems can be determined in accordance with a random hopping scheme.

Figure 6:
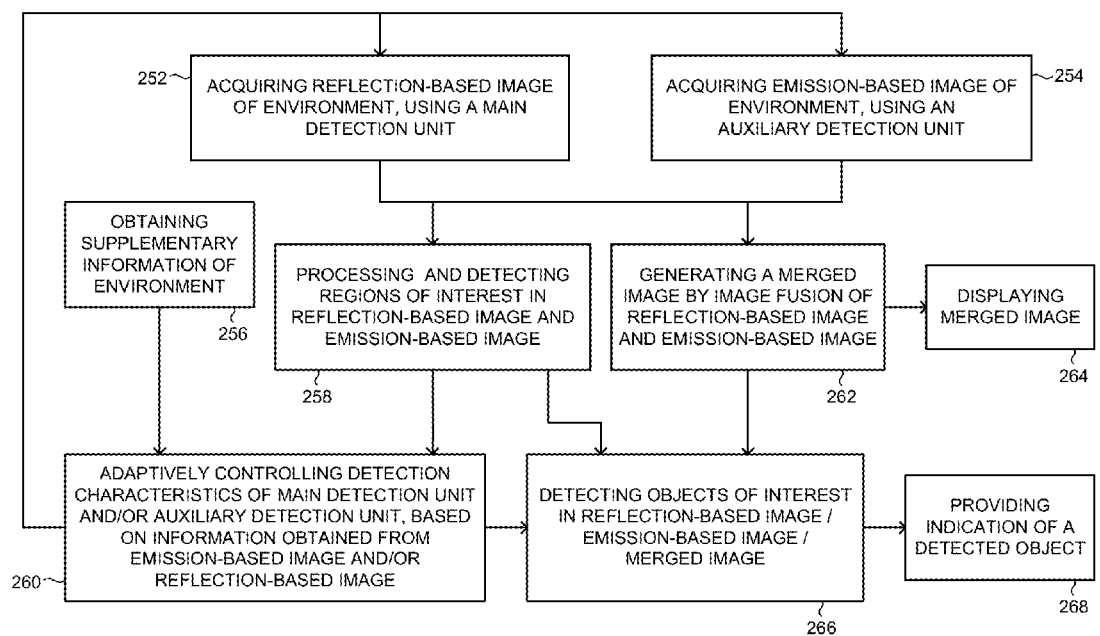
FIG. 6 is a block diagram of an imaging method for object detection, operative in accordance with an embodiment of the present invention.

Reference is now made to FIG. 6, which is a block diagram of an imaging method for object detection, operative in accordance with an embodiment of the present invention. In procedure 252, a reflection-based image of an environment is acquired using a main detection unit. Referring to FIGS. 1 and 3, light source 102 emits light pulses 116 toward an environment to be imaged, such as along a road being traveled by vehicle 120. Camera 104 accumulates reflections 118 reflected from objects illuminated by the emitted light pulses 116, and generate a reflection-based image 170 from the accumulated reflections 118. Main detection unit 130 may operate in a gated imaging mode, to image a selected DOF in the environment.

In procedure 254, an emission-based image of the environment is acquired using an auxiliary detection unit. Referring to FIGS. 1 and 3, thermal sensor 107 of auxiliary detection unit 140 detects thermal radiation 128 emitted from objects in the imaged environment and generates an emission-based image 180.

In procedure 256, supplementary information of the environment is obtained. Referring to FIG. 1, system 100 receives information relating to the imaged environment, by means of a supplemental detection unit or data source (not shown). For example, system 100 may obtain the lighting or weather conditions in the vicinity of vehicle 120 (e.g., via an ambient sensor or humidity sensor). System 100 may also obtain the location and driving route of vehicle 120 (e.g., via a GPS and/or digital map), or real-time parameters of vehicle 120, such as velocity and acceleration (e.g., via the vehicle communication bus). A further example is a radar or lidar detector or laser rangefinder, which may provide the relative distances to potential objects in the environment.

In procedure 258, the acquired reflection-based image and the acquired emission-based image are processed and regions of interest are detected. Referring to FIGS. 1 and 3, image processor 108 analyzes reflection-based image 170 acquired by main detection unit 130 and detects ROIs 172 and 174, where ROI 172 is identified as a vehicle, whereas ROI 174 appears unclear and obscured and cannot be accurately identified. Image processor 108 further analyzes emission-based image 180 acquired by auxiliary detection unit 140 and detects ROIs 182 and 184, corresponding to ROIs 172 and 174 of image 170.

In procedure 260, a detection characteristic of the main detection unit and/or the auxiliary detection unit is adaptively controlled, based on information obtained from the emission-based image and/or the reflection-based image. Referring to FIGS. 1 and 3, controller 106 sets or adjusts at least one detection characteristic relating to main detection unit 130 and/or auxiliary detection unit 140, based on the processing of reflection-based image 170 and emission-based image 180. For example, controller 106 may modify at least one operating parameter of main detection unit 130, such as a gating/imaging parameter of light source 102 and/or image sensor 105. Alternatively or additionally, controller 106 may modify at least one operating parameter of auxiliary detection unit 140, such as by adjusting an imaging parameter of thermal sensor 107 (e.g., direction, FOV, gain).

For example, controller 106 may direct main detection unit 130 to obtain further reflection-based images in a particular DOF following a partial detection of a potential object (e.g., ROI 184 in auxiliary image 180), such as by altering the FOV of camera 104 or FOI of light source 102, and/or by adjusting at least one gating parameter of light source 102 and/or camera 104 (e.g., pulse width, pulse intensity, cycle duration, and the like). Controller 106 may also direct main detection unit 130 to track a ROI identified in an auxiliary image. Further alternatively, controller 106 may adjust an object detection threshold relating to main detection unit 130 and/or auxiliary detection unit 140. For example, controller 106 may lower a detection threshold in a reflection-based image, in accordance with an ROI detected in an emission-based image. Image processor 108 may restrict processing of a reflection-based image to certain pixels or image regions in accordance with information obtained from an initial processing of an emission-based image (e.g., after identifying ROI 184 as a potential object candidate in emission-based image 180, processor 108 focuses further analysis to the corresponding image region 174 of reflection-based image 170). The decision process may be based upon: motion detection, object tracking, classification, etc. This may be performed after each image frame, or intermittently after a certain number of frames. Image processor 108 may also be directed to process at least a minimum number of reflection-based images and/or emission-based images, before establishing a detected object of interest. Image processor 108 may further be directed to exclude a certain number of reflection-based images and/or emission-based images, such as if environmental conditions preclude full, clear or useful imaging by a respective detection unit 130, 140. In general, controller 106 may (iteratively) adjust imaging parameters or other detection characteristics of main detection unit 130 and/or of auxiliary unit 140 when collecting additional reflection-based images and/or emission-based images, based on analysis of previously acquired reflection-based images and/or emission-based images, in a manner that reduces the potential object candidates in the additional images, thereby improving the detection and identification of objects of interest. A detection characteristic of main detection unit 130 and/or auxiliary detection unit 140 may also be controlled in accordance with the obtained supplementary information of the environment (procedure 256). For example, controller 106 may direct main detection unit 130 to image a selected range slice (DOF), based on the measured distance to a potential object provided by a radar detector.

In procedure 262, a merged image is generated by image fusion of the reflection-based image and the emission-based image. Referring to FIGS. 1 and 3, image processor 108 generates merged image 190, by image fusion of reflection-based image 170 and emission-based image 180, such as by combining thermal information of ROIs 182, 184 in emission-based image 180 with the respective image regions 172, 174 of reflection-based image 170.

In procedure 264, the merged image is displayed. Referring to FIGS. 1 and 3, display 110 displays merged image 190, such as to a driver or passenger of vehicle 120. Display 110 may also present supplementary content, such as text or symbols indicating characteristics associated with detected objects in the displayed image.

In procedure 266, at least one object of interest is in the reflection-based image, the emission-based image, and/or the merged image. Referring to FIGS. 1 and 3, image processor 108 processes and analyzes merged image 190 (and/or additional reflection-based images and emission-based images acquired after images 170, 180) and detects objects of interest in the imaged environment, including objects that may not have been detectable in initially acquired images 170, 180. For example, processor 108 identifies image region 194 in image 190 as a pedestrian, corresponding to previously detected ROI 184 of emission-based image 180 and ROI 174 of reflection-based image 170. Processor 108 may classify or identify detected objects using information from database 122, such as based on thermal signature data. Processor 108 may also update new object classifications in database 122.

In procedure 268, an indication of a detected object is provided. Referring to FIGS. 1 and 3, system 100 provides an alert or notification relating to a detected object of interest, such as a visual, tactile or audio indication of a potential road hazard to an operator of vehicle 120, such as by highlighting pedestrian 194 on image 190 on display 110, or by illuminating the object directly in the environment with a visible light subunit of light source 102. System 100 may also provide warnings or notifications relating to the detected objects in conjunction with a driving assistance module. Different types of indications may be provided for different detected objects, in accordance with detection metrics or other relevant criteria. For example, display 110 may present different objects with different visual characteristics, based on their respective confidence level or reliability (i.e., the validity or veracity of the object detection and/or object classification), such as by using a first color to represent a "highly reliable" object detection while using a second color to represent a "less reliable" object detection.

The method of FIG. 6 is generally implemented in an iterative manner, such that at least some of the procedures are performed repeatedly or continuously, in order to keep imaging the surrounding environment for at least a selected duration. Accordingly, imaging system 100 may use information learned from previous imaging sessions in order to enhance future performance, for example, by selecting optimal imaging parameters for different environmental conditions and/or by adjusting imaging parameters (or other detection characteristics) of detection units 130, 140 in an optimal manner, based on previous results. System 100 may implement artificial intelligence techniques, such as machine learning and pattern recognition, in order to learn relevant information from previous imaging sessions.

While certain embodiments of the disclosed subject matter have been described, so as to enable one of skill in the art to practice the present invention, the preceding description is intended to be exemplary only. It should not be used to limit the scope of the disclosed subject matter, which should be determined by reference to the following claims.

The invention claimed is:

1. An imaging system comprising:
   a main detection unit, configured to acquire reflection-based images of an environment to be imaged, said main detection unit comprising:
      at least one light source, configured to emit light pulses toward said environment; and
      at least one gated image sensor, configured to receive reflections of said light pulses reflected from a selected depth of field (DOF) in said environment, and to convert said reflections into a reflection-based image,
   an auxiliary detection unit, configured to acquire emission-based images of said environment, said auxiliary detection unit comprising:

at least one thermal sensor configured to detect infrared radiation emitted from said environment, and to generate an emission-based image, an image processor, configured to process and to detect at least one region of interest (ROI) in at least one acquired reflection-based image and at least one acquired emission-based image; and a controller, configured to adaptively control at least one of detection characteristic of at least one of: said main detection unit; and said auxiliary detection unit, based on information obtained from the other one of: said main detection unit; and said auxiliary detection unit, wherein said image processor is further configured to detect at least one object of interest in at least one of: said reflection-based image; and said emission-based image.

2. The imaging system of claim 1, wherein said controller is configured to direct said main detection unit toward at least one ROI detected in said emission-based image.

3. The imaging system of claim 1, wherein said controller is configured to selectively modify at least one operating parameter of said main detection unit, said operating parameter selected from the group consisting of:
a gating parameter;
a pulse width;
a pulse intensity;
a pulse shape;
a cycle duration of at least one of said gating cycles;
a delay time of at least one of said gating cycles;
at least one depth of field (DOF);
a maximum range to be imaged;
the field of view (FOV) of said image sensor;
the field of illumination (FOI) of said light source;
the sensitivity of said image sensor;
the frame rate of said image sensor; and
any combination thereof.

4. The imaging system of claim 1, wherein said controller is configured to selectively modify at least one operating parameter of said auxiliary detection unit, said operating parameter selected from the group consisting of:
the direction of said thermal sensor;
the FOV of said thermal sensor;
the sensor gain of said thermal sensor; and
any combination thereof.

5. The imaging system of claim 1, wherein said image processor is further configured to generate a merged image by fusing at least a portion of said emission-based image with at least a portion of said reflection-based image.

6. The imaging system of claim 5, further comprising a display, configured to display at least one image selected from the group consisting of:
said reflection-based image;
said emission-based image; and
said merged image.

7. The imaging system of claim 1, further comprising a supplementary detector, configured to obtain supplementary information related to said environment,
wherein said controller is configured to selectively modify at least one operating parameter of at least one of: said main detection unit; and said auxiliary detection unit, further based on said supplementary information.

8. The imaging system of claim 1, further comprising a database comprising thermal signature data associated with different objects, wherein said image processor is configured to detect said object of interest in accordance with said thermal signature data.

9. The imaging system of claim 1, further configured to provide an indication of at least one detected object of interest.

10. The imaging system of claim 1, wherein said main detection unit is operative in a spectral range selected from the group consisting of:
visible;
near infrared (NIR);
short wave infrared (SWIR); and
any combination thereof.

11. The imaging system of claim 1, wherein said auxiliary detection unit is operative in a spectral range selected from the group consisting of:
short wave infrared (SWIR);
medium wave infrared (MWIR);
far infrared (FIR); and
any combination thereof.

12. A vehicle, comprising an imaging system comprising:
a main detection unit, configured to acquire reflection-based images of an environment to be imaged, said main detection unit comprising:
at least one light source, configured to emit light pulses toward said environment; and
at least one gated image sensor, configured to receive reflections of said light pulses reflected from a selected depth of field (DOF) in said environment, and to convert said reflections into a reflection-based image,
an auxiliary detection unit, configured to acquire emission-based images of said environment, said auxiliary detection unit comprising:
at least one thermal sensor configured to detect infrared radiation emitted from said environment, and to generate an emission-based image,
an image processor, configured to process and to detect at least one region of interest (ROI) in at least one acquired reflection-based image and at least one acquired emission-based image; and
a controller, configured to adaptively control at least one of detection characteristic of at least one of: said main detection unit; and said auxiliary detection unit, based on information obtained from the other one of: said main detection unit; and said auxiliary detection unit,
wherein said image processor is further configured to detect at least one object of interest in at least one of: said reflection-based image; and said emission-based image.

13. An imaging method comprising the procedures of:
acquiring reflection-based images of an environment with a main detection unit, by: emitting light pulses toward said environment, using at least one light source; and receiving reflections of said pulses reflected from a selected depth of field (DOF) in said environment and converting said reflections into a reflection-based image, using at least one gated image sensor;
acquiring emission-based images of said environment with an auxiliary detection unit, by detecting infrared radiation emitted from said environment and generating an emission-based image, using a thermal sensor;
processing and detecting at least one region of interest (ROI) in at least one acquired reflection-based image and at least one acquired emission-based image;
adaptively controlling at least one detection characteristic of at least one of: said main detection unit; and said auxiliary detection unit, based on information obtained from the other one of: said main detection unit; and said auxiliary detection unit; and detecting at least one object of interest in at least one of:
said reflection-based image; and said emission-based image.

14. The imaging method of claim 13, wherein said procedure of adaptively controlling at least one detection characteristic comprises directing said main detection unit toward at least one ROI detected in said emission-based image.

15. The imaging method of claim 13, wherein said procedure of adaptively controlling at least one detection characteristic comprises selectively modifying at least one operating parameter of said main detection unit, said operating parameter selected from the group consisting of:
a gating parameter;
a pulse width;
a pulse intensity;
a pulse shape;
a cycle duration of at least one of said gating cycles;
a delay time of at least one of said gating cycles;
at least one depth of field (DOF);
a maximum range to be imaged;
the field of view (FOV) of said image sensor;
the field of illumination (FOI) of said light source;
the sensitivity of said image sensor;
the frame rate of said image sensor; and
any combination thereof.

16. The imaging method of claim 13, wherein said procedure of adaptively controlling at least one detection characteristic comprises selectively modifying at least one operating parameter of said auxiliary detection unit, said operating parameter selected from the group consisting of:
the direction of said thermal sensor;
the FOV of said thermal sensor;
the sensor gain of said thermal sensor; and
any combination thereof.

17. The imaging method of claim 13, further comprising the procedure of generating a merged image by fusing at least a portion of said emission-based image with at least a portion of said reflection-based image.

18. The imaging method of claim 17, further comprising the procedure of displaying at least one image selected from the group consisting of:
said reflection-based image;
said emission-based image; and
said merged image.

19. The imaging method of claim 13, further comprising the procedure of obtaining supplementary information related to said environment, wherein said procedure of adaptively controlling at least one detection characteristic, is further performed based on said supplementary information.

20. The imaging method of claim 13, further comprising the procedure of providing an indication of at least one detected object of interest.

21. The imaging method of claim 18, wherein said procedure of adaptively controlling at least one detection characteristic comprises selectively modifying at least one operating parameter of said auxiliary detection unit, said operating parameter selected from the group consisting of:
the direction of said thermal sensor;
the FOV of said thermal sensor;
the sensor gain of said thermal sensor; and
any combination thereof.

22. The imaging method of claim 18, further comprising the procedure of generating a merged image by fusing at least a portion of said emission-based image with at least a portion of said reflection-based image.

23. The imaging method of claim 22, further comprising the procedure of displaying at least one image selected from the group consisting of:
said reflection-based image;
said emission-based image; and
said merged image.

24. The imaging method of claim 18, further comprising the procedure of obtaining supplementary information related to said environment.

25. The imaging method of claim 24, wherein said supplementary information is selected from the group consisting of:
ambient light in said environment;
weather or climate conditions in said environment;
time or date;
location or driving route of a vehicle on which said system is mounted;
the velocity or acceleration of said vehicle; and
the relative distance to potential objects in said environment.

26. The imaging method of claim 24, wherein said procedure of adaptively controlling at least one detection characteristic, is further performed based on said supplementary information.

27. The imaging method of claim 18, further comprising the procedure of providing an indication of at least one detected object of interest.

28. The imaging method of claim 18, wherein said indication is selected from the group consisting of:
a visual notification;
a tactile notification;
an audio notification;
visually indicating said object of interest on a displayed image;
illuminating said object of interest in said environment;
an indication of a potential road hazard of a vehicle on which said system is mounted;
a forward collision warning (FCW);
a lane departure warning (LDW);
a traffic sign recognition (TSR); and
any combination thereof.

* * * * *